United States Patent
Stallman et al.

(10) Patent No.: US 8,626,101 B2
(45) Date of Patent: Jan. 7, 2014

(54) WIRELESS ELECTRONIC DEVICE WITH ANTENNA CYCLING

(75) Inventors: Michael J. Stallman, Redwood City, CA (US); Nicholas W. Lum, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 153 days.

(21) Appl. No.: 13/212,990

(22) Filed: Aug. 18, 2011

(65) Prior Publication Data

US 2013/0045700 A1    Feb. 21, 2013

(51) Int. Cl.
*H04B 1/06* (2006.01)
*H04B 7/00* (2006.01)
*H04B 7/08* (2006.01)
*H01Q 21/28* (2006.01)

(52) U.S. Cl.
CPC .............. *H04B 7/0814* (2013.01); *H01Q 21/28* (2013.01)
USPC ...... 455/277.1; 455/272; 455/289; 455/277.2

(58) Field of Classification Search
USPC .................... 455/272, 276.1, 277.1, 280, 289
See application file for complete search history.

(56) References Cited

U.S. PATENT DOCUMENTS

| | | | |
|---|---|---|---|
| 6,735,447 B1 | 5/2004 | Muller | |
| 7,071,776 B2 | 7/2006 | Forrester et al. | |
| 8,351,849 B2 * | 1/2013 | Ying | 455/13.3 |
| 2007/0111681 A1 | 5/2007 | Alberth, Jr. et al. | |
| 2009/0284438 A1 | 11/2009 | Matsunaga et al. | |
| 2011/0021139 A1 | 1/2011 | Montgomery et al. | |
| 2011/0304512 A1 * | 12/2011 | Friederich et al. | 343/702 |
| 2012/0052820 A1 * | 3/2012 | Lin et al. | 455/90.2 |
| 2012/0062424 A1 * | 3/2012 | Hwang | 342/374 |
| 2012/0142291 A1 * | 6/2012 | Rath et al. | 455/127.1 |

FOREIGN PATENT DOCUMENTS

EP     1109247     * 6/2001 .............. H01Q 1/24

* cited by examiner

*Primary Examiner* — Duc M Nguyen
(74) *Attorney, Agent, or Firm* — Treyz Law Group; Chih-Yun Wu

(57) ABSTRACT

A wireless electronic device may contain multiple antennas. Control circuitry in the wireless electronic device may adjust antenna switching circuitry so that the device repeatedly cycles through use of each of the antennas. In a device with first and second antennas, the device may repeatedly toggle between the first and second antennas. During each toggling cycle time period, the first antenna may transmit for a fraction of the time period and the second antenna may transmit for a fraction of the time period. The wireless device may control the average power emitted by each antenna by adjusting the fractions of time assigned to each antenna. By performing antenna toggling, the average transmit power produced by each antenna may be reduced while maintaining the average transmit power produced by the device at a desired level.

20 Claims, 7 Drawing Sheets

WIRELESS ELECTRONIC DEVICE WITH ANTENNA CYCLING

BACKGROUND

This invention relates generally to electronic devices, and more particularly, to wireless electronic devices that have two or more antennas.

Electronic devices such as handheld electronic devices and other portable electronic devices are becoming increasingly popular. Examples of handheld devices include handheld computers, cellular telephones, media players, and hybrid devices that include the functionality of multiple devices of this type. Popular portable electronic devices that are somewhat larger than traditional handheld electronic devices include laptop computers and tablet computers.

Due in part to their mobile nature, portable electronic devices are often provided with wireless communications capabilities. For example, portable electronic devices may use long-range wireless communications to communicate with wireless base stations and may use short-range wireless communications links such as links for supporting the Wi-Fi® (IEEE 802.11) bands at 2.4 GHz and 5.0 GHz and the Bluetooth® band at 2.4 GHz.

To satisfy consumer demand for small form factor wireless devices, manufacturers are continually striving to reduce the size of components that are used in these devices while providing enhanced functionality. It is generally impractical to completely shield a user of a portable device from transmitted radio-frequency signals. For example, conventional cellular telephone handsets generally emit signals in the vicinity of a user's head during telephone calls. Government regulations limit radio-frequency signal powers. In particular, so-called specific absorption rate (SAR) standards are in place that impose maximum energy absorption limits on handset manufacturers. At the same time, wireless carriers require that the handsets that are used in their networks be capable of producing certain minimum radio-frequency power levels so as to ensure satisfactory operation of the handsets.

The manufacturers of portable wireless electronic devices therefore face challenges in producing devices with adequate wireless performance that are compliant with applicable government regulations.

It would therefore be desirable to be able to provide electronic devices with improved wireless communications capabilities.

SUMMARY

A wireless electronic device may be subject to maximum energy absorption limits that restrict the maximum wireless transmit powers of the device. The wireless electronic device may have two or more antennas. The wireless electronic device may perform periodic antenna switching operations to provide increased energy absorption safety margins and increased performance.

For example, in a wireless device with a first antenna at one end of the device and a second antenna at an opposing end of the device, the device may repeatedly cycle between a first configuration in which a first antenna is active and a second configuration in which a second antenna is active. During each time period in this switching cycle, the first antenna may be active for a first fraction of the time period and the second antenna may be active for a second fraction of the time period. By toggling between antennas in this way, the amount of power emitted for each antenna may be reduced to help provide additional safety margin while satisfying performance criteria.

By adjusting the fractions of time that the first and second antennas are active for each cycle time period while toggling between the first and second antennas, the wireless device may control the time-averaged power emitted by each antenna and distribute radio-frequency power more evenly in space. The antenna toggling process may therefore reduce the concentration of wireless emissions produced by each antenna while maintaining a desired overall emitted power level.

Further features of the present invention, its nature and various advantages will be more apparent from the accompanying drawings and the following detailed description.

DETAILED DESCRIPTION

The present invention relates generally to wireless communications, and more particularly, to wireless electronic devices that perform antenna toggling when transmitting radio-frequency signals.

The wireless electronic devices may be portable electronic devices such as laptop computers or small portable computers of the type that are sometimes referred to as ultraportables. Portable electronic devices may include tablet computing devices (e.g., a portable computer that includes a touch-screen display). Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices may be handheld electronic devices.

The wireless electronic devices may be, for example, cellular telephones, media players with wireless communications capabilities, handheld computers (also sometimes called personal digital assistants), remote controllers, global positioning system (GPS) devices, tablet computers, and handheld gaming devices. The wireless electronic devices may also be hybrid devices that combine the functionality of multiple conventional devices. Examples of hybrid portable electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

Figure 1:
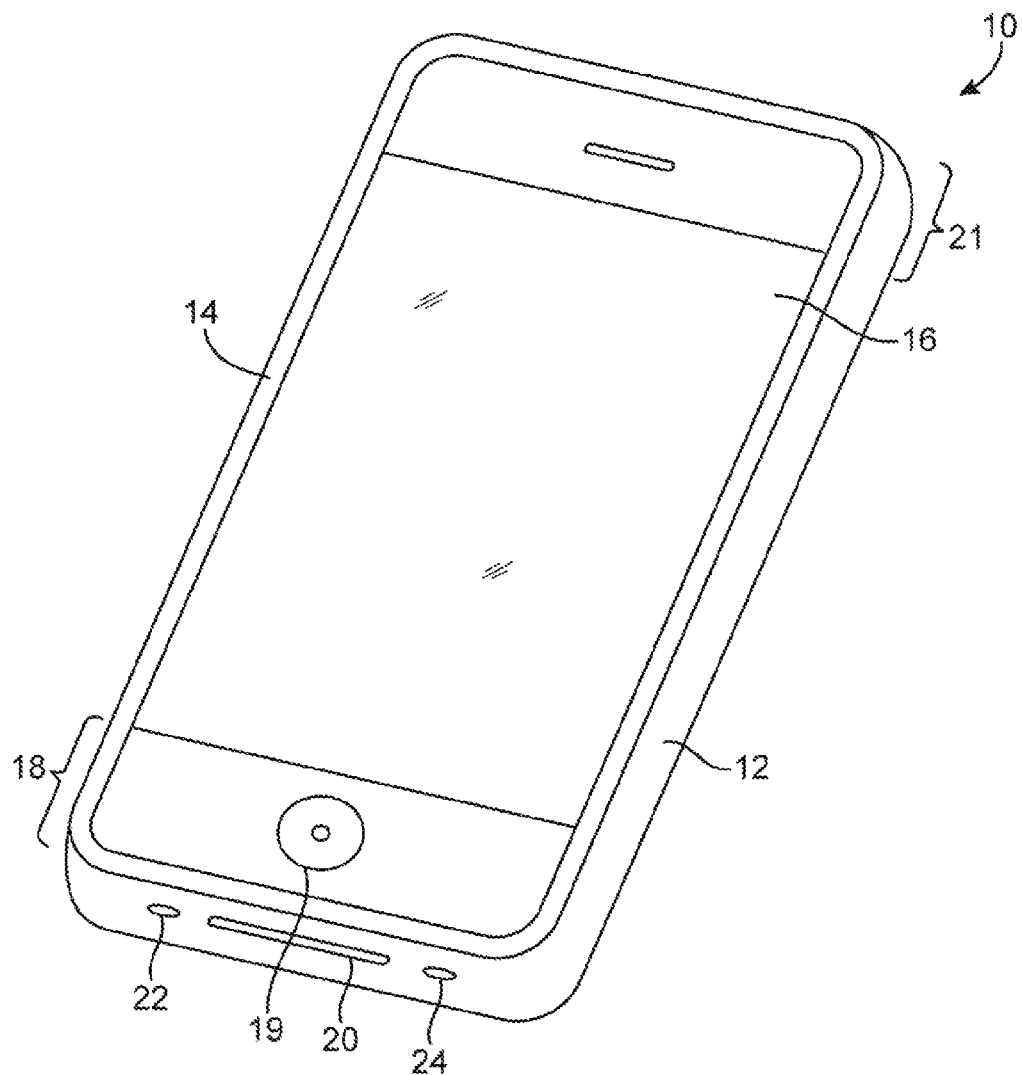
FIG. 1 is a perspective view of an illustrative electronic device with antenna toggling capabilities in accordance with an embodiment of the present invention.

An illustrative portable electronic device in accordance with an embodiment of the present invention is shown in FIG. 1. Device 10 of FIG. 1 may be, for example, a portable electronic device.

Device 10 may have housing 12. Antennas for handling wireless communications may be housed within housing 12 (as an example).

Housing 12, which is sometimes referred to as a case, may be formed of any suitable materials including, plastic, glass, ceramics, metal, or other suitable materials, or a combination of these materials. In some situations, housing 12 or portions of housing 12 may be formed from a dielectric or other low-conductivity material, so that the operation of conductive antenna elements that are located in proximity to housing 12 is not disrupted. Housing 12 or portions of housing 12 may also be formed from conductive materials such as metal. An illustrative housing material that may be used is anodized aluminum. Aluminum is relatively light in weight and, when anodized, has an attractive insulating and scratch-resistant surface. If desired, other metals can be used for the housing of device 10, such as stainless steel, magnesium, titanium, alloys of these metals and other metals, etc. In scenarios in which housing 12 is formed from metal elements, one or more of the metal elements may be used as part of the antennas in device 10. For example, metal portions of housing 12 may be shorted to an internal ground plane in device 10 to create a larger ground plane element for that device 10. To facilitate electrical contact between an anodized aluminum housing and other metal components in device 10, portions of the anodized surface layer of the anodized aluminum housing may be selectively removed during the manufacturing process (e.g., by laser etching).

Housing 12 may have a bezel 14. The bezel 14 may be formed from a conductive material and may serve to hold a display or other device with a planar surface in place on device 10. As shown in FIG. 1, for example, bezel 14 may be used to hold display 16 in place by attaching display 16 to housing 12.

Display 16 may be a liquid crystal diode (LCD) display, an organic light emitting diode (OLED) display, or any other suitable display. The outermost surface of display 16 may be formed from one or more plastic or glass layers. If desired, touch screen functionality may be integrated into display 16 or may be provided using a separate touch pad device. An advantage of integrating a touch screen into display 16 to make display 16 touch sensitive is that this type of arrangement can save space and reduce visual clutter.

Display screen 16 (e.g., a touch screen) is merely one example of an input-output device that may be used with electronic device 10. If desired, electronic device 10 may have other input-output devices. For example, electronic device 10 may have user input control devices such as button 19, and input-output components such as port 20 and one or more input-output jacks (e.g., for audio and/or video). Button 19 may be, for example, a menu button. Port 20 may contain a 30-pin data connector (as an example). Openings 24 and 22 may, if desired, form microphone and speaker ports. In the example of FIG. 1, display screen 16 is shown as being mounted on the front face of portable electronic device 10, but display screen 16 may, if desired, be mounted on the rear face of portable electronic device 10, on a side of device 10, on a flip-up portion of device 10 that is attached to a main body portion of device 10 by a hinge (for example), or using any other suitable mounting arrangement.

If desired, device 10 may include sensors such as proximity sensors, accelerometers, or other sensors. The sensors may be built into housing 12 or formed in other locations in device 10. For example, display 16 may be a touch screen display that detects when a head of a user is in contact with the touch screen display (e.g., when the user is making a phone call). Device 10 may include capacitive proximity sensors, light source based proximity sensors, touch sensors, radio-frequency based proximity sensors, or any other desirable proximity sensor. Device 10 may use the sensors to identify the positioning of device 10 relative to nearby objects. For example, device 10 may use the proximity sensor to identify that device 10 is near an object such as a head or a hand of a user. Device 10 may use multiple sensors to provide more accurate information about the positioning of the device. As an example, device 10 may use a first proximity sensor to identify that the device is held near a head of a user, may use a second proximity sensor to identify that the device is being held by a hand, and may use an accelerometer to identify that the device is being held at an angle.

A user of electronic device 10 may supply input commands using user input interface devices such as button 19 and touch screen 16. Suitable user input interface devices for electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. Although shown schematically as being formed on the top face of electronic device 10 in the example of FIG. 1, buttons such as button 19 and other user input interface devices may generally be formed on any suitable portion of electronic device 10. For example, a button such as button 19 or other user interface control may be formed on the side of electronic device 10. Buttons and other user interface controls can also be located on the top face, rear face, or other portion of device 10. If desired, device 10 can be controlled remotely (e.g., using an infrared remote control, a radio-frequency remote control such as a Bluetooth remote control, etc.).

Electronic device 10 may have ports such as port 20. Port 20, which may sometimes be referred to as a dock connector, 30-pin data port connector, input-output port, or bus connector, may be used as an input-output port (e.g., when connecting device 10 to a mating dock connected to a computer or other electronic device). Device 10 may also have audio and video jacks that allow device 10 to interface with external components. Typical ports include power jacks to recharge a battery within device 10 or to operate device 10 from a direct current (DC) power supply, data ports to exchange data with external components such as a personal computer or peripheral, audio-visual jacks to drive headphones, a monitor, or other external audio-video equipment, a subscriber identity module (SIM) card port to authorize cellular telephone service, a memory card slot, etc. The functions of some or all of these devices and the internal circuitry of electronic device 10 can be controlled using input interface devices such as touch screen display 16.

Components such as display 16 and other user input interface devices may cover most of the available surface area on the front face of device 10 (as shown in the example of FIG. 1) or may occupy only a small portion of the front face of device 10. Because electronic components such as display 16 often contain large amounts of metal (e.g., as radio-frequency shielding), the location of these components relative to the antenna elements in device 10 should generally be taken into consideration. Suitably chosen locations for the antenna elements and electronic components of the device will allow the antennas of electronic device 10 to function properly without being disrupted by the electronic components.

Examples of locations in which antenna structures may be located in device 10 include region 18 (e.g., a first antenna) and region 21 (e.g., a second antenna). These are merely illustrative examples. Any suitable portion of device 10 may be used to house antenna structures for device 10 if desired.

Figure 2:
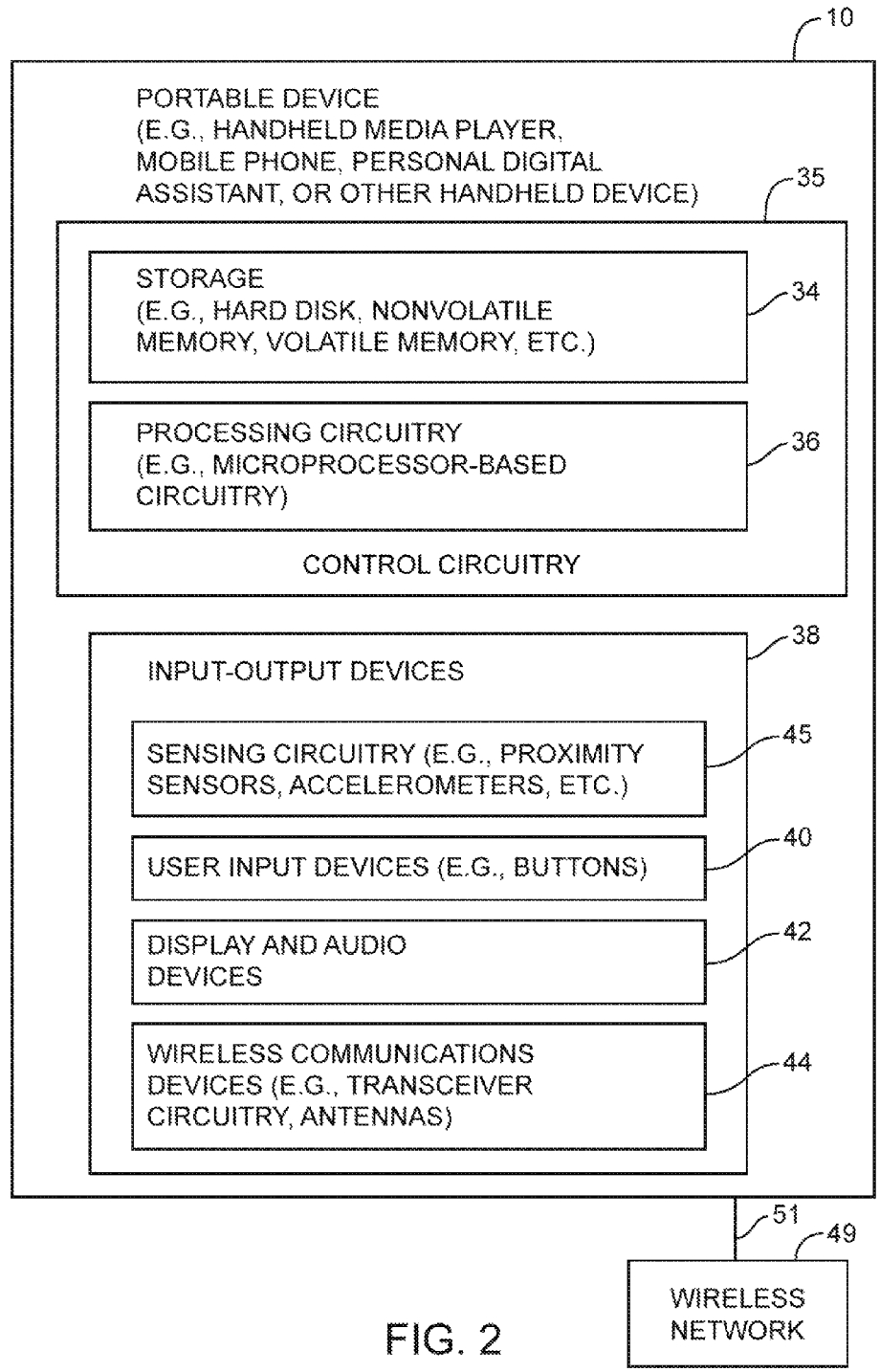
FIG. 2 is a schematic diagram of an illustrative portable electronic device in accordance with an embodiment of the present invention.

A schematic diagram of an embodiment of an illustrative portable wireless electronic device such as a portable electronic device is shown in FIG. 2. Portable device 10 may be a mobile telephone, a mobile telephone with media player capabilities, a handheld computer, a laptop computer, a tablet computer, an ultraportable computer, a combination of such devices, or any other suitable portable electronic device.

As shown in FIG. 2, device 10 may include control circuitry 35 such as processing circuitry 36 and storage 34.

Storage 34 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 36 may be used in control circuitry 35 to control the operation of device 10. For example, processing circuitry 36 and storage 34 of control circuitry 35 may be used in adjusting switching circuitry for controlling which antenna in device 10 is being used as a currently active antenna and may be used in implementing other control functions.

Processing circuitry 36 may be based on a processor such as a microprocessor and other suitable integrated circuits. With one suitable arrangement, processing circuitry 36 and storage 34 are used to run software on device 10, such as internet browsing applications, voice-over-internet-protocol (VOIP) telephone call applications, email applications, media playback applications, operating system functions, etc. Processing circuitry 36 and storage 34 may be used in implementing suitable communications protocols. Communications protocols that may be implemented using processing circuitry 36 and storage 34 include internet protocols, wireless local area network protocols (e.g., IEEE 802.11 protocols—sometimes referred to as Wi-Fi®), protocols for other short-range wireless communications links such as the Bluetooth® protocol, protocols for handling 3G data services such as UMTS, cellular telephone communications protocols, protocols for handling 4G data services such as LTE, etc.

Input-output devices 38 may be used to allow data to be supplied to device 10 and to allow data to be provided from device 10 to external devices. Display screen 16, button 19, microphone port 24, speaker port 22, and dock connector port 20 are examples of input-output devices 38.

Input-output devices 38 can include user input-output devices 40 such as buttons, touch screens, joysticks, click wheels, scrolling wheels, touch pads, key pads, keyboards, microphones, cameras, etc. A user can control the operation of device 10 by supplying commands through user input devices 40. Display and audio devices 42 may include liquid-crystal display (LCD) screens or other screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Wireless communications devices 44 may include communications circuitry such as radio-frequency (RF) transceiver circuitry formed from one or more integrated circuits, power amplifier circuitry (e.g., power amplifier circuitry that is controlled by control signals from processing circuitry 36 to minimize power consumption), passive RF components, antennas, and other circuitry for handling RF wireless signals. Wireless signals can also be sent using light (e.g., using infrared communications).

Sensing circuitry 45 may include proximity sensors such as capacitive proximity sensors, touch sensors, light-emitting photosensors, inductive proximity sensors, touch screen sensors, radio-frequency antenna-based proximity sensors, and other desirable proximity sensors. Sensing circuitry 45 may also include accelerometers and other sensing circuitry.

Wireless network 49 may include any suitable network equipment, such as cellular telephone base stations, cellular towers, wireless data networks, computers associated with wireless networks, etc. For example, wireless network 49 may include network management equipment that monitors the wireless signal strength of the wireless handsets (cellular telephones, handheld computing devices, etc.) that are in communication with network 49.

To improve the overall performance of the network and to ensure that interference between handsets is minimized, the network management equipment may send power adjustment commands (sometimes referred to as transmit power control commands) to each handset. The transmit power control settings that are provided to the handsets direct handsets with weak signals to increase their transmit powers, so that their signals will be properly received by the network. At the same time, the transmit power control settings may instruct handsets whose signals are being received clearly at high power to reduce their transmit power control settings. This reduces interference between handsets and allows the network to maximize its use of available wireless bandwidth.

The antenna structures and wireless communications devices of device 10 may support communications over any suitable wireless communications bands. For example, wireless communications devices 44 may be used to cover communications frequency bands such as cellular telephone voice and data bands at 850 MHz, 900 MHz, 1800 MHz, 1900 MHz, and the communications band data at 2170 MHz band (commonly referred to as a UMTS or Universal Mobile Telecommunications System band), the Wi-Fi® (IEEE 802.11) bands at 2.4 GHz and 5.0 GHz (also sometimes referred to as wireless local area network or WLAN bands), the Bluetooth® band at 2.4 GHz, and the global positioning system (GPS) band at 1550 MHz. If desired, wireless communications devices 44 may also be used to cover the Long Term Evolution (LTE) uplink and downlink communications frequency bands.

Device 10 can cover these communications bands and/or other suitable communications bands with proper configuration of the antenna structures in wireless communications circuitry 44. Any suitable antenna structures may be used in device 10. For example, device 10 may have multiple antennas. The antennas in device 10 may each be used to cover a single communications band or each antenna may cover multiple communications bands. If desired, one or more antennas may cover a single band while one or more additional antennas are each used to cover multiple bands. These are merely illustrative arrangements. Any suitable antenna structures may be used in device 10 if desired.

A wireless device such as device 10 may be operated in scenarios in which restrictions are imposed on the radio-frequency power emitted by the device. Device 10 that communicates with a cellular base station may be required to meet specific absorption rate (SAR) requirements (e.g., due to government regulations). The SAR requirements may impose limits on the amount of power that is emitted from device 10 and absorbed by a nearby object. For example, government regulations may require that less than 2 Watts per Kilogram is absorbed from device 10 by a nearby object.

As an example, device 10 may communicate with a base station that directs the device to increase or decrease transmit power levels (e.g., to maintain acceptable levels of radio-frequency signals received at the base station). In this scenario, the base station may identify that radio-frequency signals received from the device are relatively poor (e.g., because the device is too far away from the base station or because there are interfering radio-frequency signals from other devices). The base station may direct device 10 to increase transmit powers so that signal quality at the base station is improved. However, increased transmit power levels may emit concentrations of radio-frequency power that exceed acceptable levels. Device 10 may be unable to comply with the instructions from the base station (e.g., because of government regulations) and wireless communications between the device and the base station may be disrupted (e.g., because wireless transmissions produced by device 10 may have insufficient power to reach the base station).

Figure 3:
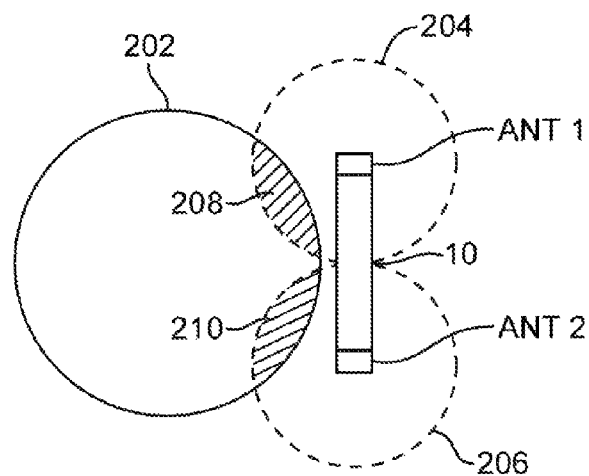
FIG. 3 is a diagram of an illustrative scenario in which radio-frequency transmissions may be toggled between a first and second antenna in accordance with an embodiment of the present invention.

To increase radio-frequency transmit power levels and reduce the concentration of radiated energy from the device, device 10 may perform antenna toggling. FIG. 3 shows an illustrative scenario in which a device 10 located near an object 202 may perform antenna toggling. As shown in FIG. 3, device 10 may have a first antenna ANT1 and a second antenna ANT2. Device 10 may be subject to energy absorption limits such as specific absorption ratio (SAR) requirements that limit the amount of power that is allowed to be absorbed by any given portion of object 202. As an example, SAR requirements may limit the maximum amount of radio-frequency power absorbed by any given portion of object 202 from device 10 to 1.6 Watts per kilogram.

Device 10 may toggle between antennas ANT1 and ANT2 by repeatedly cycling between antennas ANT1 and ANT2 (e.g., using switching circuitry). Region 208 of object 202 may absorb most of the radio-frequency signals transmitted by antenna ANT1 and region 210 of object 202 may absorb most of the radio-frequency signals transmitted by antenna ANT2. By toggling between antennas ANT1 and ANT2, the average power absorbed by object 202 from device 10 may be distributed over an increased area (e.g., the combined area of regions 208 and 210). Therefore the average power absorbed by any given region of object 202 may be reduced.

In the scenario of FIG. 3, the energy emitted into portion 208 by antenna ANT1 may be substantially equal to the energy emitted into portion 210 by antenna ANT2 (e.g., because the distance between portion 208 and antenna ANT1 may be the same as the distance between portion 210 and antenna ANT2). To minimize the power absorbed by portion 208 and portion 210, it may be desirable for device 10 to toggle equally between antennas ANT1 and ANT2.

Figure 4:
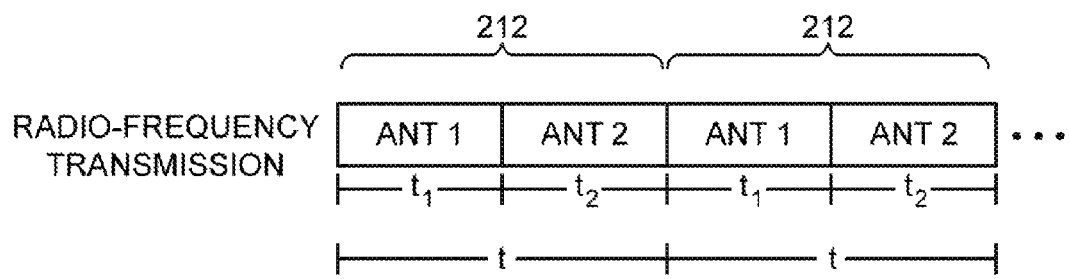
FIG. 4 is a diagram of an illustrative antenna toggling scheme that may be used in the scenario of FIG. 3 in accordance with an embodiment of the present invention.

Antenna toggling may be performed based on repeating cycles. As shown in FIG. 4, device 10 may divide radio-frequency transmissions into toggling cycle time periods 212 that each correspond to a transmission time t. As an example, time t may correspond to the time required to transmit a given number of data packets. Each toggling cycle time period 212 may be partitioned into a first fraction (portion) transmitted by antenna ANT1 and a second fraction transmitted by antenna ANT2 (e.g., antenna ANT1 may transmit during time t1 of each toggling cycle time period, antenna ANT2 may transmit during time t2 of each toggling cycle time period, and time t may be the sum of times t1 and t2).

The proportions of times t1 and t2 relative to toggling cycle time period t may be selected to maximize a radio-frequency transmission power of device 10 while ensuring sufficient energy absorption safety margins (e.g., ensuring that SAR levels remain below a maximum allowable SAR level specified by government regulations). Times t1 and t2 may be selected based on antenna characteristics (e.g., antenna efficiency), the positioning of device 10 relative to objects such as objects 202 that are subject to specific absorption rate requirements, or the strength of signals received at each antenna from a base station (as examples). In a scenario such as FIG. 3 in which the time-averaged power emitted by antennas ANT1 and ANT2 are equally absorbed by object 202, times t1 and t2 may be assigned the same value (e.g., to equally partition radio-frequency signals between antennas ANT1 and ANT2).

Figure 5:
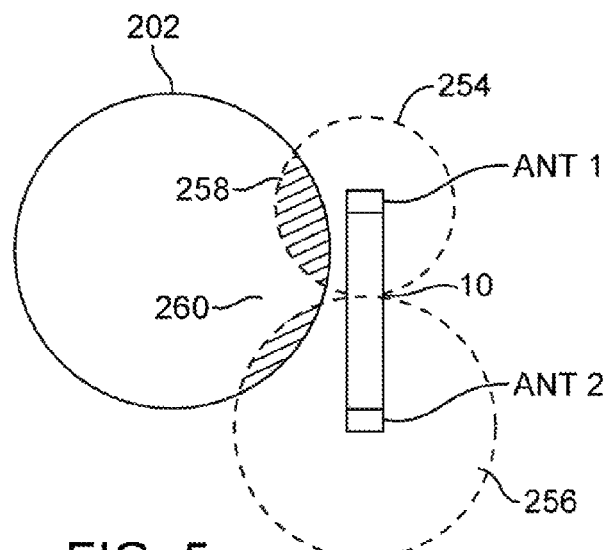
FIG. 5 is a diagram of an illustrative scenario in which a first antenna may be assigned a smaller fraction of a toggling cycle time period than a second antenna in accordance with an embodiment of the present invention.

Antenna toggling may be adjusted based on the position of device 10 relative to object 202. FIG. 5 shows an illustrative example of a device 10 positioned relative to object 202 such that radio-frequency transmissions from antenna ANT1 have a greater effect on object 202 than radio-frequency transmissions from antenna ANT2 (e.g., because antenna ANT2 may be further away from object 202 than antenna ANT1). In the example of FIG. 5, radio-frequency signals 256 from antenna ANT2 may be mostly absorbed by object portion 260 and radio-frequency signals 254 from antenna ANT1 may be mostly absorbed by object portion 258.

To decrease the amount of radio-frequency power absorbed by object 202, device 10 may increase the fraction of each toggling cycle time period that is assigned to antenna ANT2 and decrease the fraction of each toggling cycle time period that is assigned to antenna ANT1 (e.g., because object 202 absorbs less of the radio-frequency signals from antenna ANT2 than the radio-frequency signals from antenna ANT1). In this way, the safety of device 10 may be improved while maintaining transmission power levels of the device.

Figure 6:
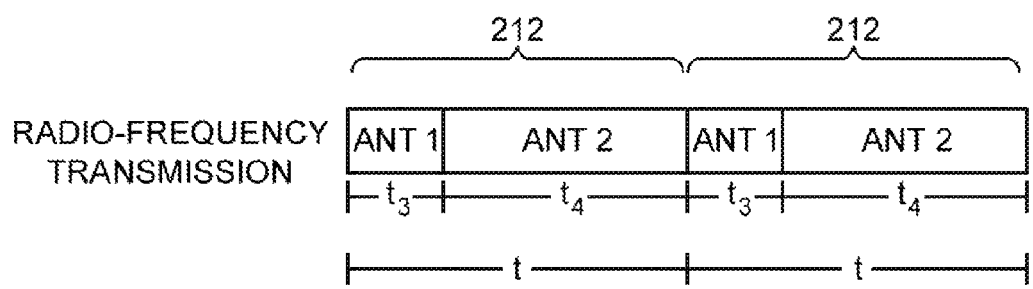
FIG. 6 is a diagram of an illustrative antenna toggling scheme that may be used in the scenario of FIG. 5 in accordance with an embodiment of the present invention.

FIG. 6 shows how antenna toggling may be performed by wireless device 10 in a scenario such as FIG. 5. As shown in FIG. 6, each toggling cycle time period of a radio-frequency transmission may be partitioned into a first fraction (portion) transmitted by antenna ANT1 over time t3 and a second fraction transmitted by antenna ANT2 over time t4. In the example of FIG. 6, the proportion of each toggling cycle time period assigned to antenna ANT1 may be smaller than the proportion of each toggling cycle time period assigned to antenna ANT2 (e.g., t3 may be less than t4). In this way, the average power transmitted by each antenna may be reduced (e.g., because each antenna transmits for only a fraction of each toggling cycle time period) while maintaining the average power transmitted by device 10.

The examples of FIGS. 3-6 showing antenna toggling between two antennas are merely illustrative. If desired, radio-frequency transmissions may be partitioned between any suitable number of antennas. For example, a wireless device 10 with three antennas may partition radio-frequency transmissions between the three antennas to provide improved performance and to reduce radio-frequency emissions of each antenna.

The positioning of device 10 relative to object 202 in FIGS. 3 and 5 are merely illustrative. Device 10 may be located in many different positions (e.g., next to the head of a user, on a user's lap, in a user's pocket, in a user's hand, etc.). For each scenario, device 10 may adjust the fractions of each toggling cycle time period assigned to each antenna to maximize performance and ensure sufficient energy absorption safety margins.

Figure 7:
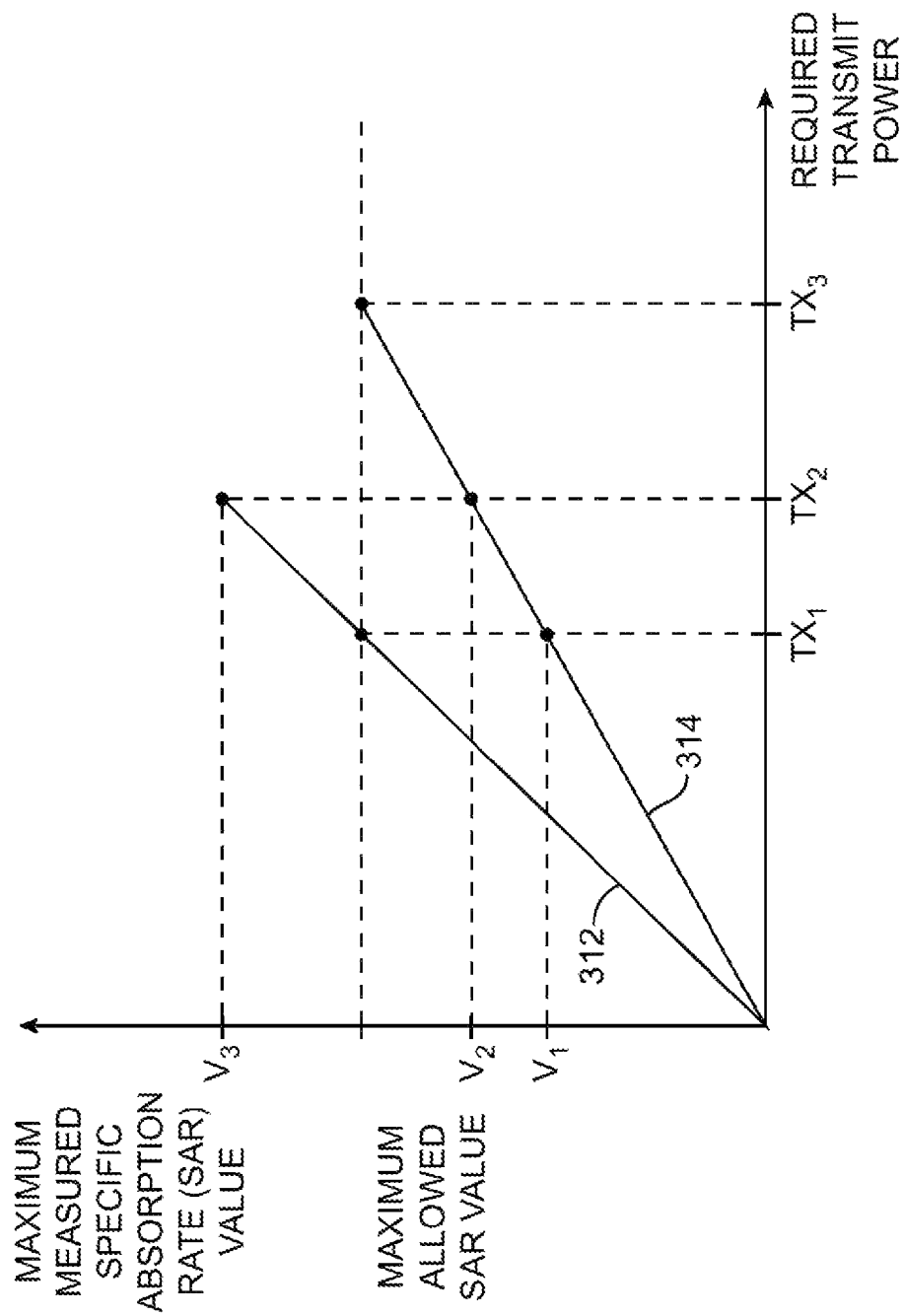
FIG. 7 is a diagram illustrating how a wireless device that performs antenna toggling may accommodate desired transmit power levels while providing increased energy emission safety margins in accordance with an embodiment of the present invention.

By reducing the average power transmitted by each antenna using antenna toggling, device 10 may provide increased performance and energy absorption safety margins. FIG. 7 is an illustrative diagram showing how antenna toggling may decrease maximum measured SAR values for various required transmit powers. The maximum measured SAR values may correspond to the maximum power absorbed by any portion of object 202 for a given required transmit power and a given position of device 10 (e.g., the device position of FIG. 3 or FIG. 5). The required transmit power may be provided by a cellular base station (e.g., provided by transmit power control commands that are sent from the cellular base station to device 10).

In the example of FIG. 7, line 312 may correspond to maximum measured SAR values for a conventional wireless device (e.g., a device that does not perform antenna toggling). As shown by line 312, the maximum measured SAR values may be proportional to the required transmit power (e.g., a minimum transmit power required to communicate with a cellular base station). At transmit power TX1, the maximum measured SAR value for the conventional device may reach a maximum allowed SAR value (e.g., a maximum allowed SAR value determined by government regulations). At transmit powers greater than TX1, SAR values measured from the conventional device may exceed the maximum allowed value. To avoid violating government regulations, the conventional device may be unable to increase transmit power levels beyond TX1.

A device that does not perform antenna toggling may be unable to comply with commands from a cellular base station to increase transmit powers beyond TX1 (e.g., transmit power control commands). As an example, a cellular base station may instruct the conventional wireless device to increase transmit power to a value greater than TX1 when the cellular base station receives a relatively weak transmitted signal from the conventional device (e.g., when the device is too far away from the cellular base station). If the wireless device is unable to increase transmit power beyond TX1, communication with the cellular base station may be undesirably disrupted.

A wireless device 10 that performs antenna toggling may produce maximum measured SAR values that correspond to line 314. As shown by line 314, the maximum measured SAR values for device 10 may be less than the maximum measured values for a conventional device for any given required transmit power. For example, measured SAR values for device 10 at transmit power TX1 may have a maximum value V1. V1 may be less than the maximum allowed SAR value and provide improved margins of safety (e.g., a device 10 that produces maximum measured SAR values of V1 at a transmit power of TX1 may provide improved safety margins over a conventional device that produces the maximum allowed SAR value at transmit power TX1).

By performing antenna toggling, device 10 may provide improved wireless performance. As shown in FIG. 7, device 10 may be able to provide transmit powers that are greater than TX1 while maintaining acceptable energy absorption safety margins. At a required transmit power of TX2, device 10 may produce a maximum measured SAR value of V2 that is less than the maximum allowed SAR value (as an example). A conventional wireless device would be unable to increase transmit powers to TX2, because the convention device would produce unacceptable SAR values (e.g., because V3 exceeds the maximum allowed SAR value). By performing antenna toggling, device 10 may be able to increase transmit power levels to TX3 while maintaining acceptable energy absorption safety margins.

Figure 8:
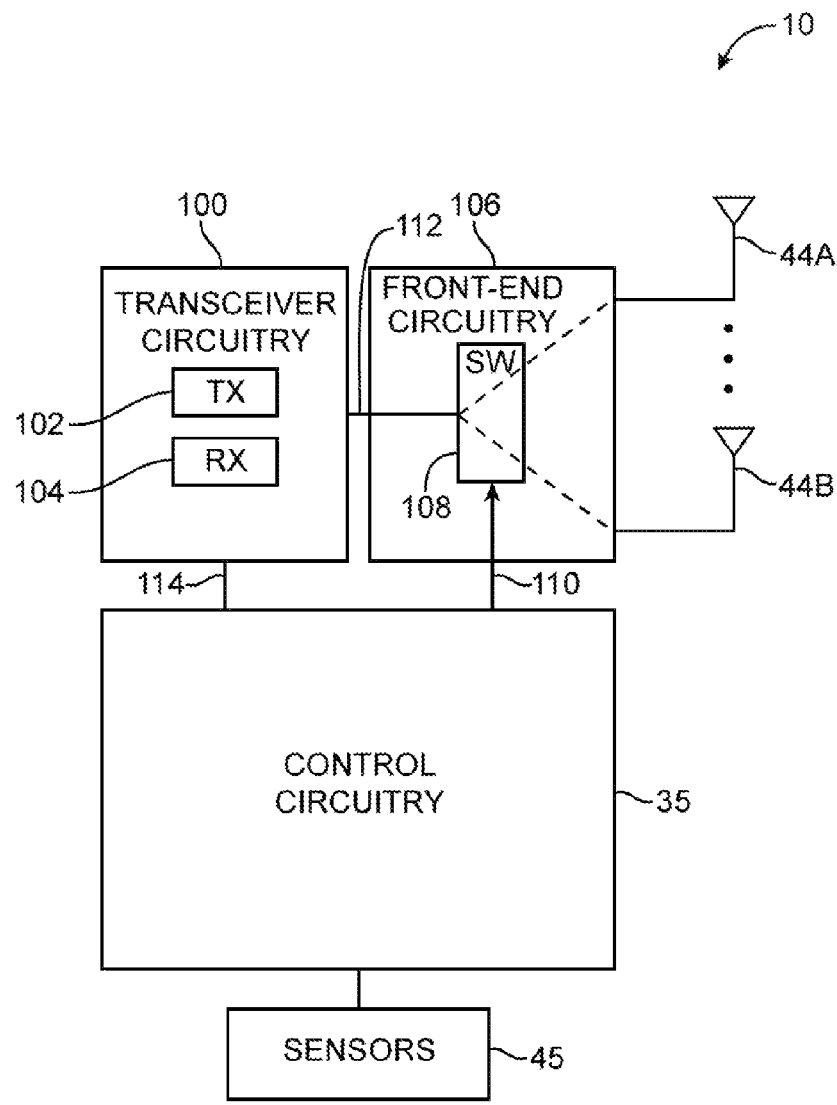
FIG. 8 is a diagram showing how control circuitry in an electronic device may be used to periodically adjust switching circuitry in the device to toggle between use of first and second antennas in accordance with an embodiment of the present invention.

FIG. 8 is a diagram showing how control circuitry 35 may be used in controlling switching circuitry to toggle between first and second antennas in device 10. If desired, more than two antennas may be used in device 10 and control circuitry 35 may direct the switching circuitry to sequence through the use of each of these antennas. The example of FIG. 8 in which device 10 has a pair of antennas and in which control circuitry 35 is used to toggle repeatedly back and forth between the two antennas is merely illustrative.

As shown in FIG. 8, device 10 may include radio-frequency transceiver circuitry such as transceiver circuitry 100. Transceiver circuitry 100 may include one or more transmitters such as transmitter 102 (e.g., one or more cellular telephone transmitters or transmitters associated with other radio access technologies). Transceiver circuitry 100 may also include one or more radio-frequency receiver circuits such as receiver 104 (e.g., for receiving cellular telephone signals or other wireless traffic). Control circuitry 35 may provide data that is to be wirelessly transmitted to transceiver circuitry 100 via path 114. During signal reception operations, received data may be provided to control circuitry 35 from transceiver circuitry 100 via path 114.

During operation, transmitted signals from transmitter 102 may be conveyed to antennas 44A and 44B (e.g., antennas ANT1 and ANT2 of FIG. 3) via front-end circuitry 106. Front-end circuitry 106 may also be used to convey radio-frequency signals from antennas 44A and 44B to receiver 104 during signal reception operations.

Front-end circuitry 106 may include filter circuitry such as duplexers and diplexers, impedance matching circuitry, switches such as switch 108, and other radio-frequency circuitry for coupling transceiver circuitry 100 to antennas 44A and 44B.

Switching circuitry 108 may be controlled by control signals provided by control circuitry 35 over path 110. The control signals may be generated by a processing circuit in control circuitry 35 (e.g., a baseband processor or a microprocessor). During operation of device 10, the control signals on path 110 may direct switch 108 to alternate between first and second states. In the first state, antenna 44A is switched into use and is coupled to transceiver circuitry 100 (via path 112). In the first state, antenna 44B is isolated from transceiver circuitry 100 and therefore is not used in transmitting or receiving signals. In the second state, antenna 44B is switched into use in place of antenna 44A. In the second state, signals can be transmitted through antenna 44B using transmitter 102 and signals can be received from antenna 44B using receiver 104.

To help balance the power that is transmitted through a given antenna, control circuitry 35 may toggle antennas 44A and 44B. For example, control circuitry 35 may issue control signals on path 110 so that switching circuitry 108 alternates between its first configuration in which antenna 44A is switched into use and its second configuration in which antenna 44B is switched into use. By periodically cycling between antennas 44A and 44B in this way, neither antenna is used exclusively and the time-averaged power emitted from each antenna is reduced. This may help device 10 comply with regulatory limits on emitted radio-frequency power (e.g., SAR requirements).

Any suitable partitioning scheme may be used to control the fraction of time that each antenna is active. With one suitable arrangement, control circuitry 35 may be configured to switch the first antenna into use for a first fraction of a time period and may be configured to switch the second antenna into use for a second fraction of a time period. The sum of the first and second fractions of the time period may be equal to the length of the time period, so that either the first or second antenna (but not both) is active at any point in time. As described in connection with FIG. 6, for example, control circuitry 35 may toggle between use of the first and second antennas with a period t. During each period t, antenna 44A may be active for subperiod t3 (i.e., the fraction of time that antenna 44A is active is t3/t). Antenna 44B may be active for subperiod t4 within each period (i.e., the fraction of time that antenna 44B is active is t4/t). Because t3+t4 is equal to t, at least one of the two antennas will be used at any point in time.

In configurations of device 10 in which accelerometers, proximity sensors, or other sources of proximity information, orientation information, etc. are available, device 10 may control the relative amount of time that each antenna is active in real time. For example, if control circuitry 35 receives information from sensors 45 indicating that antenna 44A is closer to an external object than antenna 44B (or is otherwise likely to emit more signal power into the external object than antenna 44B), control circuitry 35 may increase time period t4 and can decrease time period t3 by a corresponding amount. The period t may be maintained at a constant value (as an example), but the fraction of time that antenna 44A is used may be decreased while the fraction of time that antenna 44B is used may be increased. During operation, device 10 may therefore continually adjust the duty cycle (fraction of time in which each antenna is active) for each antenna to help distribute the localized emission of radio-frequency signal power in a way that ensures regulatory compliance.

Figure 9:
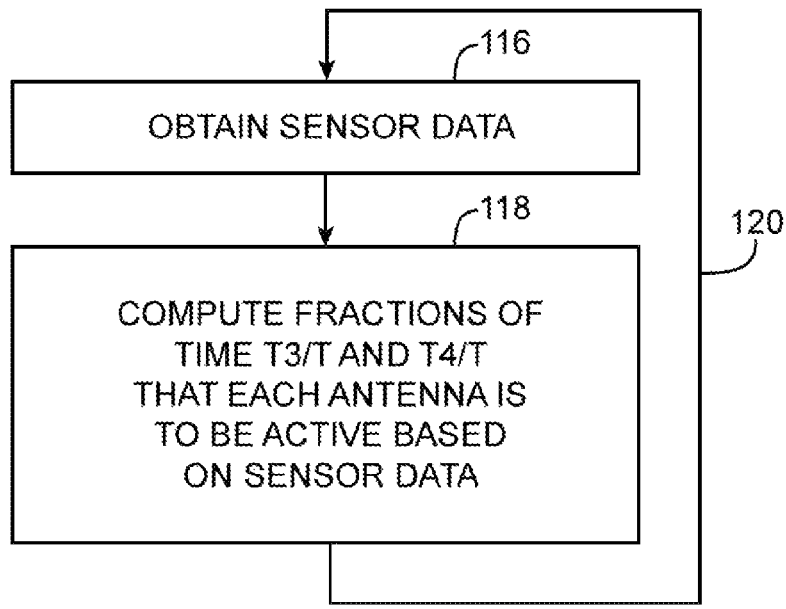
FIG. 9 is a flow chart of illustrative steps that may be performed to compute fractions of time that each antenna is to be active in accordance with an embodiment of the present invention.

Device 10 may continually update the optimum values of t3 and t4 in real time based on sensor data. As shown in FIG. 9, control circuitry 35 may, at step 116, receive sensor data from sensors 45 (e.g., accelerometer data indicating the position of device 10 and therefore a probable position relative to an external object, proximity sensor data indicating the position of device 10 relative to an external object, etc.). Based on the sensor data and other data (e.g., information on the relative efficiencies of each antenna, information on the spatial radiation-emission properties of each antenna, etc.), control circuitry 35 may, at step 118, update the values of t3 and t4. As shown by line 120, the operations of steps 116 and 118 may be performed continually in real time, so that device 10 is continually provided with updated information on an optimal allocation between use of antenna 44A and antenna 44B.

Figure 10:
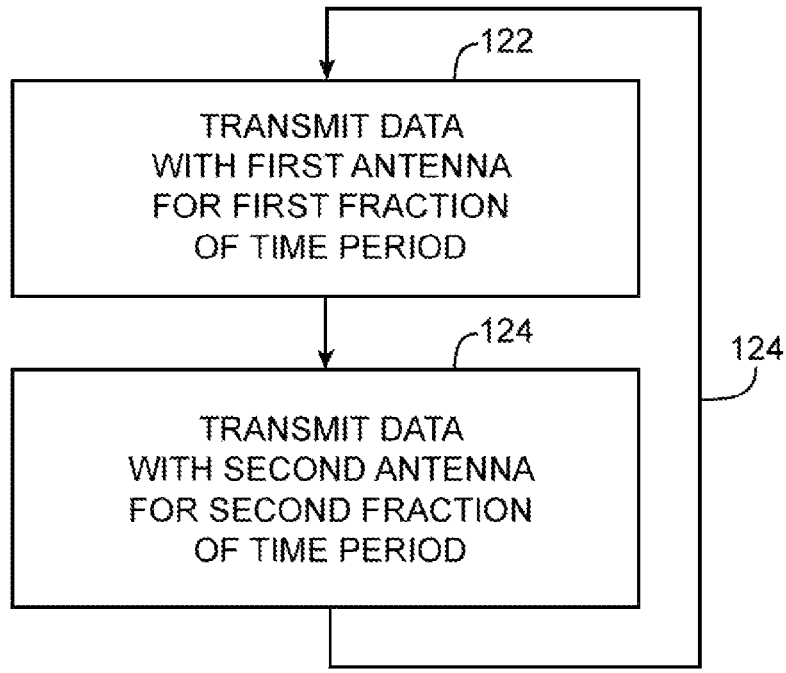
FIG. 10 is a flow chart of illustrative steps that may be performed to toggle between first and second antenna when transmitting data in accordance with an embodiment of the present invention.

Steps involved in transmitting signals from device 10 based on the settings produced during the operations of FIG. 9 or based on default (e.g., fixed) settings are shown in FIG. 10. During the operations of FIG. 10, device 10 may toggle back and forth repeatedly between antennas 44A and 44B, so that neither antenna is used continuously. In this way, emitted radio-frequency signals are effectively spread across both antennas and an enlarged portion of device 10. If, for example, antenna 44A is located at one end of device 10 whereas antenna 44B is located at another end of device 10, toggling between the two antennas will tend to spread the radiated power from device 10 across both ends of device 10, rather than concentrating this power at only one end of device 10.

Transmitter 102 may be used in transmitting signals for both antenna 44A and antenna 44B. Switching circuitry 108 may be toggled between its first and second configurations. During the operations of step 122, control circuitry 35 may place switching circuitry 108 in its first configuration, so that transmitted radio-frequency signals from transmitter 102 are transmitted through first antenna 44A. During the operations of step 124, control circuitry 35 may place switching circuitry 108 in its second configuration, so that transmitted radio-frequency signals from transmitter 102 are transmitted through second antenna 44B. The operations of steps 122 and 124 may each be performed once per toggling cycle time period (i.e., step 122 is performed once and step 124 is performed once per each of the complete toggling cycles indicated by line 124).

Each loop (cycle) through the steps 122 and 124 therefore corresponds to a separate toggling cycle time period t (i.e., the period of a complete toggling cycle that involves use of each antenna for its respective fraction of time is equal to t). The duration that the first antenna is used (step 122) is time t3 and the fraction of time that the first antenna is used during the toggling cycle time period is t3/t. The duration that the second antenna is used (step 124) is time t4 and the fraction of time that the second antenna is used during the toggling cycle time period is t4/t.

The foregoing is merely illustrative of the principles of this invention and various modifications can be made by those skilled in the art without departing from the scope and spirit of the invention.

What is claimed is:

1. A wireless electronic device, comprising:
  at least first and second antennas;
  at least one radio-frequency transmitter;
  switching circuitry coupled between the transmitter and the first and second antennas, wherein the switching circuitry is configured to route radio-frequency signals from the radio-frequency transmitter to a selected one of the first and second antennas;
  control circuitry configured to repeatedly toggle the switching circuitry between a first configuration in which the radio-frequency signals are transmitted through the first antenna for a first fraction of a toggling cycle time period and a second configuration in which the radio-frequency signals are transmitted through the second antenna for a second fraction of the toggling cycle time period; and
  an accelerometer that generates orientation data, wherein the control circuitry is further configured to adjust the first and second fractions based at least partly on orientation data from the accelerometer.

2. The wireless electronic device defined in claim 1 further comprising at least one sensor, wherein the control circuitry is further configured to adjust the first and second fractions based at least partly on data from the sensor.

3. The wireless electronic device defined in claim 2 wherein the sensor comprises a proximity sensor.

4. The wireless electronic device defined in claim 2 further comprising a housing having first and second opposing ends, wherein the first antenna is located at the first end and the second antenna is located at the second end.

5. The wireless electronic device defined in claim 1 further comprising a housing having first and second opposing ends, wherein the first antenna is located at the first end and the second antenna is located at the second end.

6. A method of operating a wireless electronic device having first and second antennas, a radio-frequency transmitter, control circuitry, and switching circuitry that selectively routes radio-frequency signals from the transmitter to the first and second antennas in response to signals from the control circuitry, comprising:
repeatedly toggling the switching circuitry between a first configuration in which the radio-frequency signals are transmitted through the first antenna for a first fraction of a toggling cycle time period and a second configuration in which the radio-frequency signals are transmitted through the second antenna for a second fraction of the toggling cycle time period; and
with the control circuitry, adjusting the first and second fractions based at least partly on antenna efficiencies of the first and second antennas.

7. The method defined in claim 6 wherein repeatedly toggling the switching circuitry comprises applying control signals to the switching circuitry from the control circuitry.

8. The method defined in claim 7 wherein the wireless electronic device includes at least one sensor, the method further comprising:
with the control circuitry, adjusting the first and second fractions based at least partly on data from the at least one sensor.

9. The method defined in claim 8 wherein the at least one sensor comprises a proximity sensor and wherein adjusting the first and second fractions comprises adjusting the first and second fractions based at least partly on proximity sensor data from the proximity sensor.

10. The method defined in claim 8 wherein the at least one sensor comprises an accelerometer and wherein adjusting the first and second fractions comprises adjusting the first and second fractions based at least partly on data from the accelerometer.

11. The method defined in claim 10 wherein the wireless electronic device has a housing with first and second opposing ends, wherein the first antenna is located at the first end and the second antenna is located at the second end, and wherein repeatedly toggling the switching circuitry comprises repeatedly toggling the switching circuitry between the first configuration so that the radio-frequency signals are transmitted through the first antenna at the first end and the second configuration so that the radio-frequency signals are transmitted through the second antenna at the second end.

12. The method defined in claim 6 wherein the wireless electronic device has a housing with first and second opposing ends, wherein the first antenna is located at the first end and the second antenna is located at the second end, and wherein repeatedly toggling the switching circuitry comprises repeatedly toggling the switching circuitry between the first configuration so that the radio-frequency signals are transmitted through the first antenna at the first end and the second configuration so that the radio-frequency signals are transmitted through the second antenna at the second end.

13. A method of transmitting radio-frequency signals with a wireless electronic device having at least first and second antennas, comprising:
during each of a plurality of repeating cycles each of which has an associated cycle time period, transmitting radio-frequency signals for a first fraction of the cycle time period using the first antenna and transmitting radio-frequency signals for a second fraction of the cycle time period using the second antenna;
determining whether the first antenna is closer to an external object than a second antenna; and
in response to determining that the first antenna is closer to the external object than the second antenna, reducing the first fraction of the cycle time period and increasing the second fraction of the cycle time period.

14. The method defined in claim 13 further comprising:
while transmitting the radio-frequency signals using the first and second antennas, adjusting the first and second fractions of the cycle time period based on data from a sensor within the wireless electronic device.

15. The method defined in claim 14 wherein the sensor comprises a proximity sensor and wherein adjusting the first and second fractions comprises adjusting the first and second fractions based on data from the proximity sensor.

16. The method defined in claim 14 wherein the sensor comprises an accelerometer and wherein adjusting the first and second fractions comprises adjusting the first and second fractions based on data from the accelerometer.

17. The method defined in claim 13 wherein the wireless electronic device comprises transmitter circuitry and switching circuitry that routes radio-frequency signals from the transmitter circuitry to the first and second antennas and wherein transmitting the radio-frequency signals for the first fraction of the cycle time period using the first antenna and transmitting the radio-frequency signals for the second fraction of the cycle time period using the second antenna comprises controlling the switching circuitry.

18. The method defined in claim 13 wherein the wireless electronic device has a housing with first and second opposing ends, wherein the first antenna is located at the first end and the second antenna is located at the second end, wherein transmitting the radio-frequency signals with the first antenna comprises transmitting the radio-frequency signals with the first antenna at the first end, and wherein transmitting the radio-frequency signals with the second antenna comprises transmitting the radio-frequency signals with the second antenna at the second end.

19. The method defined in claim 13 wherein the radio-frequency signals are transmitted with an average power, the method further comprising:
adjusting the first and second fractions while maintaining the average power of the radio-frequency signals.

20. The method defined in claim 13 further comprising:
adjusting the first and second fractions based on signal strength of wireless signals received from a base station.

* * * * *